United States Patent Office 3,290,571
Patented Dec. 6, 1966

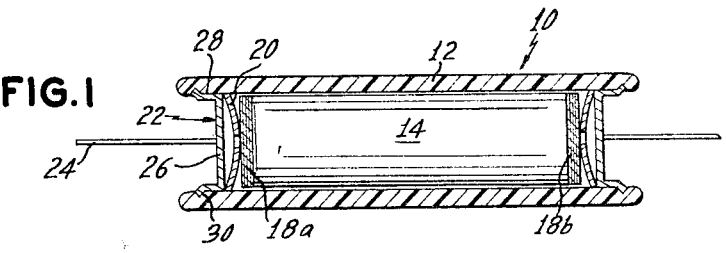
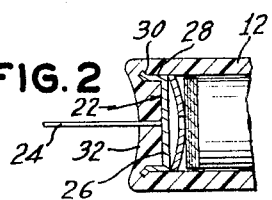
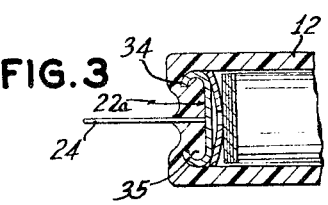
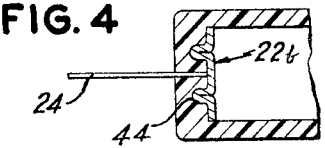
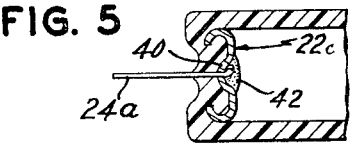
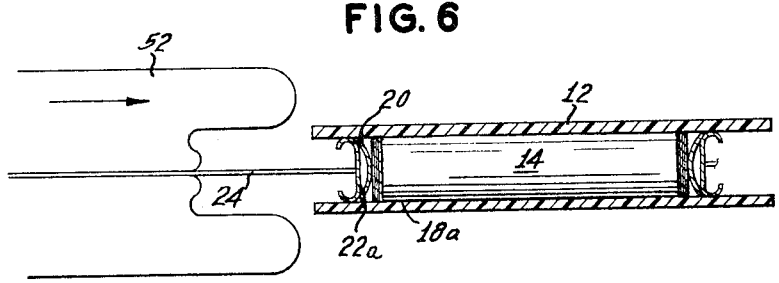
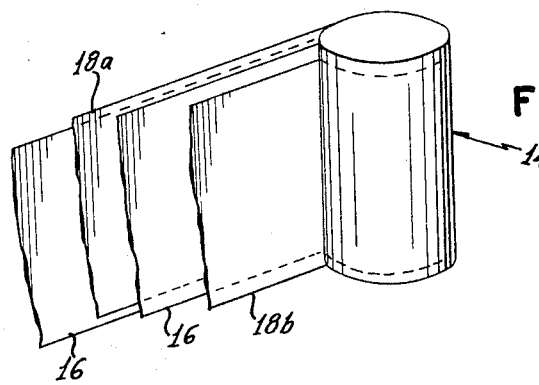

3,290,571
CAPACITOR HAVING UNITARY SEALED ENCLOSURE OF INSULATION
William M. Robinson, Fairhaven, Mass., assignor to Cornell-Dubilier Electric Corporation, a corporation of Delaware
Original application Sept. 13, 1962, Ser. No. 223,473. Divided and this application Aug. 27, 1965, Ser. No. 496,213
10 Claims. (Cl. 317—260)

This application is a division of my application Serial No. 223,473, filed September 13, 1962, entitled Capacitors and Method of Manufacture.

This invention relates to electrical capacitors and more particularly to the wound or tubular kind, and to a method for making such capacitors.

An object of this invention resides in a novel form of capacitor construction that lends itself to economical manufacture yet which meets requirements of similar capacitors, particularly in respect to exclusion of moisture.

Another object of this invention resides in the provision of a capacitor having an exterior configuration which may be closely controlled and in a method of making such capacitors. Uniformity in external size and shape is of special concern in connection with capacitors to be used in printed circuits and in conjunction with automated capacitor insertion equipment in making assembled electronic circuit apparatus.

Yet another object of this invention resides in the provision of a novel capacitor construction and in a method of manufacturing encased tubular or wound capacitors which allows the use of impregnating materials that might be degraded by exposure to high encapsulating temperatures for too long.

An important feature of this invention involves novel end cap or terminal configurations which cooperate with the capsulating material to both retain the end cap in position and to provide an effective moisture barrier protecting the interior of the capacitor. This and other objects of the invention are accomplished in the illustrative forms of capacitors described below, as embodiments of the invention in its various aspects.

In one aspect of the invention there is provided an electrical capacitor having a sealed case formed of thermoplastic insulation having a relatively high deformation temperature, which holds the contained parts in electrical contacting assembly without dependence upon preliminary connection-forming operations. The illustrative assembly method described in detail below comprises positioning a wound and impregnated capacitor body within a tubular element fabricated of a high deformation-temperature electrical insulating material, inserting a spring or other form of contact-making material (discussed more fully below), and then inserting terminal end-caps. These end caps are imperforate, they have accurately centered projecting leads, and they have an annular sealing formation subsequently the ends only of the tubular insulating element (which ends extend beyond the end-cap) are heated and formed over the end cap. In this completing operation, the lead-bearing end-caps are mounted, connections are made to both ends of the capacitor body, and the case is sealed. The operation involves a minimum of heating both as to duration and as to exposure of the capacitor body to heat. The processing temperature is high enough so that there is no danger of harm to the finished capacitor resulting from usual ambient operating temperatures.

An illustrative embodiment of the invention and various modifications are described in detail below. From this description the nature of the invention in its various aspects and further objects and features of novelty will be more fully apparent. Reference is made below to the accompanying drawings forming part of this disclosure, in which:

FIG. 1 is a longitudinal cross-section of a completed novel capacitor;

FIGS. 2, 3, 4 and 5 are views similar to FIG. 1 illustrating various capacitor end configurations;

FIG. 6 is a diagrammatic illustration of a tool and parts of a capacitor preparatory to an end-forming operation; and FIG. 7 is a diagrammatic view in perspective to show the make-up of an illustrative wound capacitor body used in FIGS. 1–6.

The illustrative electrical capacitor 10 in FIG. 1 comprises a tubular element 12 formed of thermoplastic electrical insulation having a relatively high deformation temperature. Polypropylene is particularly effective for this purpose, both in respect to its characteristics in the finished capacitor and in its characteristics in the process of manufacture. High-density polyethylene is another suitable material. Tubular element 12 forms an enclosure that is sealed to end caps 22 and contains wound capacitor body 14. Body 14 is a winding comprising layers of dielectric material 16 that separate a pair of conducting foils 18a and 18b as shown in FIG. 7. Aluminum foil is the usual material used. One of the conductive foils 18a extends edgewise beyond the dielectric layers 16 at one end of the body 14 while the other foil 18b extends beyond the dielectric layers 16 at the other end of the body. The extending edges of the foil are compacted, and they form corresponding terminal connections 18a and 18b of the capacitor body 14. The dielectric layer 16 may be a suitable plastic film such as Mylar of appropriate thickness or it may be paper. The wound body is impregnated with materials such as oil, wax or selected resins, which are well-known in the art. Contact washers 20 are made of resilient conductive material such as dished steel washers, and they are plated on both sides as with silver or nickel to maintain low contact resistance. These washers are fixed, in stressed condition, between an end cap 22 and the respective terminals 18a, 18b of the capacitor body 14. End caps 22 have accurately centered projecting lead wires 24.

In making the capacitor of FIG. 1, end caps 22 are made in the form shown with an imperforate disc 26 to which wire lead 24 is butt-welded, for example. Alternatively, as shown in FIG. 5, it may be made of a disc 40 that is pierced at its center with wire lead 24a threaded through the hole and soldered or brazed in place to restore the imperforate character of the disc. Inasmuch as there will be a certain number of imperfectly soldered or brazed parts, as a probability of the production process, the unpierced form is preferred from this point of view. A body 14 is wound and impregnated, and placed within tubular element 12 and spring washers 20 are positioned adjacent the ends of the capacitor body 14 within the ends of tubular body 12 that project well beyond the capacitor body. The parts are relatively loosely held in position by a tight fit of the end caps 22 in the bore of the tubular element which retains them in position initially. This effect of retention is enhanced with the form of end cap shown in FIG. 1, having a burr at the edge of a slight outward flange 30. Such a burr is formed by cutting or blanking the end cap in the proper direction. Heat is applied to the ends only of the tuubular element 12. The heat-softened ends of the tube are formed or curled inwardly, imbedding the end caps 22. Sufficient endwise pressure is developed in this operation so that the end-caps 22 press contact elements 20 against the capacitor body with enough force to stress contact elements 20. The heating and forming operation may be performed simultaneously by one tool 52 at one end of the assembly while the parts assembly is supported to resist endwise pressure. Thereafter the other end may similarly be subjected to heating and forming by endwise pressure of a shaped, heated tool while the capacitor is firmly supported. Alternatively, both ends of the capacitor may be simultaneously formed by coaxial tools 52. The tool is suitably heated, as by an imbedded resistance heating element (not shown). Sufficient individual pressure is developed during each forming operation to flatten the resilient dished washers 20, and thus develop resilient contact pressure to each terminal 18a and 18b and to each end cap 22.

Since heat is applied only to the ends of the tubular element 12 which extend beyond the caps 22, the choice of impregnants used to provide the desired electrical characteristics of the capacitor body 14 is not limited by the sealing temperature but is limited only by the moderate temperature rise to which the capacitor will ultimatetly be subjected when in use. The application of heat is limited in time to that necessary to heat-soften and form the end portions of the tubular element as described; and thereafter the heating of the tool 52 is interrupted and the tool is cooled as by internally circulated water or by a cooling air blast. When the cooling has progressed sufficiently, pressure by the tool can be relaxed, without loss of stress in washers 20.

FIGS. 2-5 show various modifications of the imbedded end cap 22 of FIG. 1. In FIG. 1 the end cap 22 has a base portion 26 which contacts the spring washer 20. Wall 28 of the end cap extends upwardly from the base 26 and may be formed by drawing or spinning. An outturned flange 30 cooperates with the tubular element 12 and has a sharp edge (as mentioned above) embedded in the plastic tube to seal the capacitor and to anchor the end cap 22 in place for holding capacitor body contact washers 20 and base 26 of the end cap under pressure, thus assuring good electrical contact. In FIG. 2 the material of the thermoplastic tube has been formed over the exterior surface of the cap 22 so as to include a portion 32 covering the outer surface of base portion 26 and the lateral surface of wire 24. Since the plastic chosen may well provide only an intimate mechanical seal without actually effecting a surface-to-surface bond with the metal, a surface leakage path for possible moisture penetration may exist. Where no surface-to-surface bond is formed, the plastics employed should have moisture-repellent properties. With the intimate seal and the extended length of the surface path from the exterior to the interior of the capacitor in FIG. 2, the seal of FIG. 2 is more certain than in FIG. 1. Further, the possibility that the curled edge of plastic about edge 30 might spread under stress is eliminated.

In FIG. 3 an in-turned flange 34 is formed on the thus modified end cap 22a and the material of the tube 12 is forced intimately into conformity with the external surface of the end cap, beneath the flange 34, thus producing a still longer leakage path than that shown in FIG. 1 and FIG. 2 above. The diameter of end cap 22a is slightly larger than the inner diameter of the tubular element so that it is retained in place prior to end-sealing. The form of seal and terminal structure in FIG. 3 further provides greater resistance of the thermoplastic material forming the seal against spreading as a result of the sustained pressure of contact spring washers 20 during the life of the finished unit. These washers are subjected to stress to insure contact pressure, as described in connection with FIG. 1. Before any endwise shift of end cap 22a can occur, the large-diameter portion 35 of plastic under overhang 34 would have to move radially inward to escape from the in-turned flange 34. This means that the contained volume of plastic must be compressed or at least severely deformed, both being highly unlikely.

In making a seal per FIG. 3, the initial length of tube 12 is proportioned to provide the volume of material required in the finished end seal. Correspondingly, the internal cavity of the tool 52 is made complemental to the finished external shape of the seal.

In FIG. 4 yet another modification of end cap is shown wherein a circular ridge 44 is formed on what may be described as the external face of the end cap 22b, this being the same side from which the lead wire 24 projects. Any number of ridges 44 concentric with one another may be employed, to give additionally longer surface path and to offer increased resistance of the plastic material to becoming deformed due to the pressure maintained by stressed contact washers 20.

FIG. 5 shows another embodiment, resembling that in FIG. 3 and illustrates how an imperforate member including a pierced metal disc 40 with a central wire 24a may be formed so as to have generally the same end result as that in FIGS. 1 to 4 inclusive. Thus, in FIG. 5 the terminal wire and the metal end cap are assembled with the wire extending through a center hole in the end cap and soldered or brazed in place so that the solder or brazing mtaerial 42 closes the perforation through which the wire extends. Such a perforation is avoided in FIGS. 1-4, where the wire is butt welded to the center of the unpierced cap in a preparatory operation.

Spring 20 provides resilience that is desired in maintaining firm contact pressure. A number of lanced fine points may also be formed in the washer 20, to drive into the aluminum-foil terminals 18a and 18b of the enclosed capacitor body 14 and thereby break through the oxide film of the terminals 18a and 18b that may be an obstacle to forming a good connection. A conductive cement may also be used in place of washer 20. To special advantage the cement is a material such as epoxy-based cement providing a true surface-to-surface sealing adherence, where such cement contains sharp-edged grains of metal that cut into the aluminum-foil surface for distinctively enhanced connection to the aluminum foil. Such cement may be applied to the ends of the condenser body before insertion in tube 12 or it may be applied to the inside surfaces of the end caps before the end caps are applied to the capacitor body. Thereafter the end-sealing operation develops mechanical pressure of the end caps against the metal grains which, in turn, dig into the terminals of the capacitor body. Where the epoxy cement is conductive, (apart from the metal grains) the conduction of the terminal connections is further guaranteed. The cement is polymerized during the heat-forming of the thermoplastic end-seal material.

The foregoing description of several embodiments of the invention in its various aspects will naturally suggest further change and improvement, without departing from the spirit and scope of the invention.

What I claim is:

1. An encased tubular capacitor comprising an outer tubular element of thermoplastic insulating material, a wound capacitor body within said tubular element intermediate the ends thereof, contact spring pressure means abutting the respective ends of said wound capacitor body, and combined end contact and lead terminal assemblies in contact with said contact spring pressure elements, each of said terminal assemblies including a transverse imperforate metal wall having an integral outward-projecting annular formation, a terminal projecting from said metal wall encircled by said annular formation, the ends of said tubular element completely covering and being everywhere in intimate surface contact with the annular formation of each terminal assembly and extending into intimate surface contact with a portion of the metal wall encircled by the annular formation, said outer tubular element of thermoplastic insulating material maintaining said contact spring pressure means in stressed pressure contact with said capacitor body.

2. An encased tubular capacitor in accordance with claim 1, wherein each said annular formation incorporates an in-turned flange portion and wherein the tubular element includes portions extending into and filling the space under the in-turned flange portion.

3. An encased tubular capacitor comprising an outer tubular element of thermoplastic insulating material, a wound capacitor body within said tubular element, and at least one combined end contact and lead assembly in contact electrically and mechanically with an end of said wound capacitor body, said combined assembly including a transverse imperforate metal wall having an integral outward-projecting annular formation, a terminal projecting from said metal wall encircled by said annular formation, said tubular element being the only insulating tube which is both fixed to said metal end wall and contains said capacitor body, an end of said tubular element completely covering and being everywhere in intimate surface contact with said annular formation and extending into intimate surface contact with a portion of the metal wall encircled by the annular formation.

4. An encased tubular capacitor in accordance with claim 3, wherein said annular formation encircles and is encircled by respective portions of said transverse metal wall engaged by and in intimate surface contact with said end of said tubular element of thermoplastic insulating material.

5. An encased tubular capacitor in accordance with claim 3 wherein the peripheral portion of said metal wall embodies said annular formation and wherein the edge thereof is curled inward to form an overhang, and wherein said end portion of the tubular element fills the space under said overhang.

6. An encased tubular capacitor in accordance with claim 3 wherein said end portion of the tubular element is in intimate surface contact with the entire portion of the metal wall encircled by the annular formation and with a portion of said projecting terminal that adjoins the metal wall.

7. An encased tubular capacitor in accordance with claim 6 wherein said tubular element is of a moisture-repellent thermoplastic material.

8. An encased capacitor in accordance with claim 3, wherein said insulating material is polypropylene.

9. An encased capacitor in accordance with claim 3, wherein said insulating material is high-density polyethylene.

10. An encased capacitor in accordance with claim 3 wherein said tubular element is of a moisture-repellent thermoplastic insulating material.

References Cited by the Examiner
FOREIGN PATENTS

| | | |
|---|---|---|
| 995,670 | 8/1951 | France. |
| 436,642 | 10/1935 | Great Britain. |
| 500,733 | 2/1939 | Great Britain. |
| 512,102 | 8/1939 | Great Britain. |

OTHER REFERENCES

Bosch, German Application No. B-20,997, published January 1956.

LARAMIE E. ASKIN, *Primary Examiner.*

L. H. MYERS, *Examiner.*

E. A. GOLDBERG, *Assistant Examiner.*